United States Patent

[15] 3,643,286

Wubbe

[45] Feb. 22, 1972

[54] WINDSHIELD WIPER

[72] Inventor: Leo J. Wubbe, Beverly Shore, Ind. 46301

[22] Filed: Mar. 18, 1970

[21] Appl. No.: 20,585

[52] U.S. Cl. .................................... 15/250.38, 15/250.42
[51] Int. Cl. ............................................................ B60s 1/02
[58] Field of Search .................... 15/250.36, 250.38, 250.39, 15/250.42

[56] References Cited

UNITED STATES PATENTS

| | | | |
|---|---|---|---|
| 2,659,097 | 11/1953 | Morton | 15/250.38 |
| 2,712,146 | 7/1955 | Wise | 15/250.38 |
| 2,966,692 | 1/1961 | Zaiger | 15/250.36 |
| 3,386,123 | 6/1968 | Oishei et al. | 15/250.42 |
| 3,392,415 | 7/1968 | Shipman | 15/250.38 |

Primary Examiner—Peter Feldman
Attorney—F. W. Rose

[57] ABSTRACT

This invention relates to blade elements adapted for use in windshield wiper assemblies for wiping curved windshields. The assembly includes a blade element and a pressure-distributing superstructure operatively connected together so as to transmit and distribute pressure received by the pressure-distributing superstructure from the wiper arm to spaced locations along the length of the blade element to conform the blade element to the shape of the surface of the windshield to be wiped. The blade element comprises a support member and a resilient wiping member whose lowermost portion is adapted to wipe windshields and which is maintained under longitudinal tension by means interlocking the support member and the resilient wiping member.

7 Claims, 8 Drawing Figures

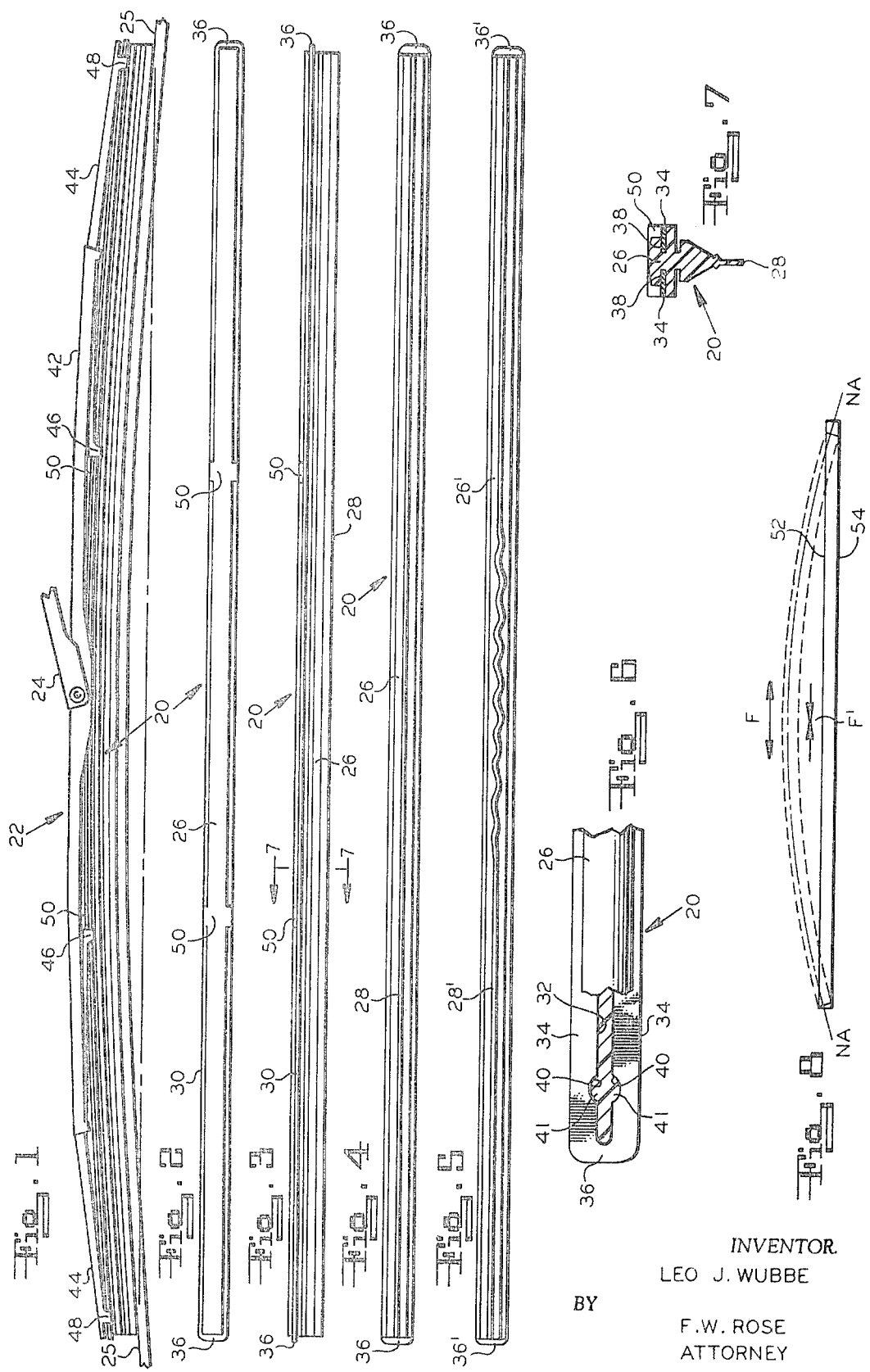

WINDSHIELD WIPER

BACKGROUND OF THE INVENTION

1. Field of the Invention

This invention relates to a blade element (comprising a support member and a resilient wiping member) for a windshield wiper assembly and more particularly to a blade element in which the resilient wiping member, which has a lowermost portion or lip adapted to wipe a windshield, is maintained under longitudinal tension which improves the performance of the wiping lip when the windshield wiper assembly is wiping a surface of substantial curvature.

2. Description of the Prior Art

Since the introduction in the 1940's of windshield wiper assemblies of the type generally shown in the John W. Anderson U.S. Pat. No. 2,596,063, such windshield wiper assemblies and variations thereof have been generally used throughout the automotive industry. These windshield wiper assemblies typically included a blade element and a superstructure which was slidably attached to the blade element and which consisted of articulated parts so that pressure received from the wiper arm was transmitted through the superstructure to spaced locations along the blade element for conformance to the windshield to be wiped. The blade element consisted of a resiliently flexible backing strip or support member and a resilient wiping member, typically made of rubber, which had a lowermost portion or lip adapted to wipe a windshield.

While such windshield wiper assemblies have generally been satisfactory, from time to time unsatisfactory wiping conditions, such as chattering or streaking, have been encountered. Various solutions to these problems have been considered, such as varying the flexibility of support member or the number or spacing of the locations at which pressure is applied to the blade element. However, as the size of the area to be wiped has increased with a resultant increase in the length of the windshield wiper assemblies, these problems have been aggravated. One persistent problem has been the streaking or smearing of a portion of the wiped area, frequently in the center.

SUMMARY OF THE INVENTION

In the attempts, over the years, to overcome the problem of streaking, a critical fact had been overlooked. As the resilient wiping member, typically made of rubber, is bowed or arched it behaves like a beam. The uppermost portion at the top of the arc is stretched while the lowermost portion at the bottom of the arc is compressed. Since the wiping lip is at the extremity of the lowermost portion of the member, the maximum compression is exerted on the wiping lip. I have observed, that when the resilient wiping lip is substantially arched, the wiping lip is sinuous rather than straight and becomes "flabby" so that it does not properly perform its wiping function with resultant streaking.

In accordance with my invention, the resilient wiping member of the blade element is prestressed (i.e., initially subjected to and subsequently maintained, during normal operation, under longitudinal tension). When such a prestressed member is bowed or arched, the compression forces due to bending are reduced or neutralized by the tension forces due to prestressing and the wiping lip remains straight and taut so that wiping is effected satisfactorily and without streaking. The prestressed condition of the blade element of my invention is achieved by providing the resilient wiping member and the support member with interlocking means so that, when these members are assembled with the resilient wiping member under longitudinal tension, such tension is maintained under normal conditions.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a side view of a windshield wiper assembly in position on a windshield;

FIG. 2 is a top view of my improved blade element;

FIG. 3 is a side view of the blade element shown in FIG. 2;

FIG. 4 is a bottom view of the blade element shown in FIG. 2;

FIG. 5 is a bottom view of a typical bowed prior art blade element;

FIG. 6 is an enlarged partly cutaway top view of an end of the blade element shown in FIG. 2;

FIG. 7 is an enlarged cross-sectional view of the blade element taken along the lines 7—7 of FIG. 3; and FIG. 8 is a schematic illustration of the forces on a resilient wiping element when it is bowed.

DESCRIPTION OF THE PREFERRED EMBODIMENT

The windshield wiper assembly shown in FIG. 1 comprises a wiper blade element indicated generally at 20 and an articulated pressure distributing assembly means or superstructure, indicated generally at 22, which receives pressure from wiper arm 24 and then distributes (i.e., transmits and proportions) such pressure to a plurality of positions, spaced locations or longitudinal points along the length of blade element 20. Blade element 20 is comformable to both flat and curved surfaces and, when urged toward the windshield 25 by the pressure-distributing assembly 22, automatically follows surfaces of varying curvatures such as those involved in wiping curved windshields.

Blade element 20 comprises a resilient wiping member or squeegee 26 which may be made of rubber or other elastomeric material and which has a lowermost or bottom portion which has a wiping edge or lip 28 and a flexible support member or flexor 30 made of resiliently flexible material such as metal or plastic of suitable thickness. Flexor 30 may be made of a single strip of metal of constant width which is die cut or formed to have a long narrow opening aperture or slot 32 which extends slightly less than the full length of the flexor thus forming two laterally spaced apart side rails or portions 34 joined at both ends by integral U-shaped bridges or end portions 36 as can be seen in FIG. 6 (FIG. 6 shows only one end of blade element 20, the other end being similarly constructed). The side rails 34 of flexor 30 are placed in oppositely disposed longitudinal grooves 38 in the uppermost or top portion of resilient wiping member 26 (see FIG. 7). Adjacent each end of flexor 30 the side rails 34 have a pair of oppositely positioned recesses, indentations, notches or keyways 40 in the sides of slot 32. The sides of grooves 38 in the resilient wiping element 26 have, adjacent the ends thereof, oppositely positioned detents, projections, protuberances or keys 41 which are engaged in and mate with keyways 40 in interlocking relationship. The purpose and operation of this construction will be more fully explained below.

The pressure-distributing assembly 22, shown in FIG. 1, comprises primary or upper pressure-distributing means, bridge or yoke 42 which is connected at its ends to secondary or lower pressure-distributing means, bridges or yokes 44 at the ends of each of which are inwardly positioned claws 46 and outwardly positioned claws 48 or other equivalent structures or arrangements which transmit pressure to blade element 20 and keep the articulated pressure-distributing assembly 22 in operative association with blade element 20. At least some of the claws slide with respect to blade element 20 so that it can bow or flex without restriction by the pressure-distributing superstructure as it moves across various parts of the windshield. The resilient wiping member 26 has shoulders 50 which act as abutments to inwardly positioned claws 46 and thus constitute means to prevent the pressure-distributing assembly 22 from being longitudinally moved or slid off the blade element in either direction. Those skilled in the art will understand that various types of pressure-distributing assemblies other than that shown in FIG. 1 may be used in accordance with the invention. Such arm pressure distributing assemblies characteristically transmit the arm pressure to the blade element adjacent the ends of the blade element and at least one intermediate location spaced along its length and comprise elongate members pivotally connected together to form an articulated structure whose members move relative to each other generally in a plane perpendicular to the surface to be wiped.

The effect of arching or bowing the resilient wiping element is schematically illustrated in FIG. 8 where the element is represented on a flat surface (i.e., in an unstressed condition) in solid lines, 52 being the upper portion and 54 being the lowermost portion or wiping lip. As the element is bowed, as shown in dotted lines in FIG. 8, it foreshortens and the portion above the neutral axis (NA in FIG. 8) is subjected to tension forces (indicated by arrows F in FIG. 8). The portion below the neutral axis is subjected to compression forces (indicated by arrows F' in FIG. 8). The compression forces increase with increasing distance from the neutral axis so that they are at a maximum at the wiping lip with resultant tendency to distort the wiping lip. Because the wiping lip is narrow laterally (i.e., its width is quite small with relation to its length) and rubber is relatively weak material in compression, such compression forces can have a pronounced effect. This effect is illustrated in FIG. 5 which is a blade element similar to that in FIG. 4 except the flexor lacks keyways 40 and the wiping element lacks keys 41 so that these members are not interlocked and the resilient wiping element is not under tension. The blade element in FIG. 5 is in a bowed or arched condition and hence the wiping lip 28' is in compression. As shown in FIG. 5, the compressed wiping lip 28' buckles and can become so distorted that it ripples in a sinusoidal manner. When this happens, the wiping lip becomes "flabby" and is not tautly held in satisfactory wiping contact with the surface to be wiped. Indeed, contact can be so poor that a high crosswind tends to blow against the wiping lip and further deteriorate the wiping contact.

In accordance with the present invention, the flexor 30 is assembled with the resilient wiping element 26 under longitudinal tension and the latter is maintained under longitudinal tension. This is achieved by spacing the pairs of keyways 40 slightly further apart than the distance between the pairs of keys 41 on the resilient wiping element. Blade element 20 is assembled by placing the side rails 34 of flexor 30 in the grooves 32 and exerting longitudinal tension on the wiping element 26 so that keyways 40 and keys 41 engage. Thereafter, keyways 40 and keys 41 form a means of interlocking the resilient wiper element 26 and the flexor 30 so that the resilient wiping element and hence the wiper lip 28 remain under longitudinal tension. Because of this prestressed condition, the compressive force that would otherwise be exerted on the wiping lip 28 when the blade element is bowed or arched tend to be neutralized and the wiping lip 28 is held in a taut condition needed for satisfactory wiping. It is to be understood that means equivalent to keyways 40 and keys 41 may be used for interlocking the flexor and resilient wiping element. Moreover, the entire length of the wiping element need not be placed under longitudinal tension but only those portions of the wiping element which would be considerably bowed, in which event the position of the interlocking means is adjusted accordingly to obtain the smooth arcuate effect needed for satisfactory wiping.

When the interlocking means are proximate the ends of a blade element as shown in FIG. 6, they have the added advantage that they resist the tendency of one end of the rubber wiping element to be slid inwardly with respect to the flexor when the windshield wiper assembly as a whole is subject to a longitudinal force (i.e., force perpendicular to the direction of oscillation) such as that which is encountered in the wiping of some windshields with articulated arm assemblies.

It will, of course, be understood that various details of construction may be varied without departing from the principles of this invention, and it is, therefore, not the purpose to limit the patent granted herein otherwise than necessitated by the scope of the appended claims.

I claim:

1. A blade element adapted for use in a windshield wiper assembly for a curved windshield, said assembly comprising a pressure-distributing superstructure adapted to apply downward pressure to the ends and to intermediate locations on said blade element, said blade element comprising a flat, integral support member extending longitudinally with respect to said blade element and being relatively flexible in a plane generally perpendicular to the surface to be wiped and relatively inflexible in a plane generally parallel to said surface, said support member having a central opening extending longitudinally to positions adjacent the ends thereof, and a resilient wiping member having a lowermost portion adapted to wipe a windshield and having oppositely disposed, outwardly facing grooves in the uppermost portion thereof in which grooves the integral support member is seated, said grooves having, adjacent both ends thereof, means cooperating with means on said integral support member, to interlock and maintain said resilient wiping member under tension when the blade element is on a flat surface.

2. A blade element adapted for use in a windshield wiper assembly for a curved windshield, said blade element comprising an integral support member relatively flexible in a plane generally perpendicular to the surface to be wiped and relatively inflexible in a plane parallel to said surface, said support member having a central slot extending longitudinally to positions adjacent the ends thereof, said slot having a pair of keyways proximate each end thereof and a resilient wiping member having a lowermost portion adapted to wipe a windshield, said resilient wiping member having oppositely disposed longitudinal grooves in the uppermost portion thereof in which grooves the integral support member is seated, the sides of said grooves having, proximate each end thereof, a pair of keys adapted to mate with the keyways in the integral support member in interlocking relationship.

3. A blade element adapted for use in a windshield wiper assembly for a curved windshield, said assembly comprising a pressure-distributing superstructure adapted to apply downward pressure to the ends and to intermediate locations on said blade element, said blade element comprising a support member relatively flexible in a plane generally perpendicular to the surface to be wiped and relatively inflexible in a plane parallel to said surface, said support member having laterally spaced-apart side portions, and a resilient wiping member having a lowermost portion adapted to wipe a windshield, said resilient wiping member having oppositely disposed longitudinal grooves in the uppermost portion thereof and being under longitudinal tension, in which grooves the laterally spaced-apart side portions of the support members are seated, said grooves and laterally spaced-apart side portions having, at longitudinally spaced-apart locations proximate each end thereof, cooperating means to interlock said support member and said resilient wiping member and maintain the latter under longitudinal tension between said spaced-apart locations when the blade element is on a flat surface and to reduce the compressive forces in the lowermost portion of the resilient wiping member when the blade element is in a curved position.

4. A windshield wiper assembly comprising a resilient flexible wiping blade element having a flexible support member and a resilient wiping member engaged with said support member and having an edge adapted to contact and wipe a windshield, an arm-pressure distributing assembly adapted to receive pressure from a windshield wiper arm and transmit such pressure to said blade element adjacent the ends of said blade element and at least one intermediate location spaced along its length, said pressure-distributing assembly comprising elongate members pivotally connected together to form an articulated structure whose members move relative to each other generally in a plane perpendicular to the surface to be wiped, said resilient wiping member being under longitudinal tension, and means interlocking said support member and said resilient wiping member to maintain the major portion of said resilient wiping member under longitudinal tension.

5. The windshield wiper assembly of claim 4 in which the support member is integral and has a central opening extending longitudinally to positions adjacent the ends of the support member, said support member having, adjacent both ends of said opening, means cooperating with means on said resilient wiping member to interlock therewith and to maintain said resilient wiping member under tension.

6. The windshield wiper assembly of claim 5 in which the resilient wiping member has oppositely disposed longitudinal grooves in the uppermost portion thereof in which grooves the integral support member is seated, said grooves having, adjacent both ends thereof, means cooperating with means on said integral support member to interlock and maintain said resilient wiping member under tension.

7. A windshield wiper assembly comprising a resilient flexible wiping blade element having a flexible support member and a resilient wiping member engaged with said support member and having an edge adapted to contact and wipe a windshield, an arm-pressure distributing assembly adapted to receive pressure from a windshield wiper arm and transmit such pressure to said blade element, said pressure-distributing assembly comprising elongate members pivotally connected together to form an articulated structure and having claw means for embracing said support member adjacent the ends of said support and at intermediate locations spaced along its length, said support member being integral and being relatively flexible in a plane generally perpendicular to the surface to be wiped and relatively inflexible in a plane parallel to said surface, said support member having a central slot extending longitudinally to positions adjacent the ends thereof, said slot having a pair of keyways proximate each end thereof, said resilient wiping member having oppositely disposed longitudinal grooves in the uppermost portion thereof in which grooves the integral support member is seated, the sides of said grooves having, proximate each end thereof, a pair of keys adapted to mate with the keyways in the integral support member in interlocking relationship.

* * * * *